United States Patent
Reddy et al.

(10) Patent No.: US 9,698,660 B2
(45) Date of Patent: Jul. 4, 2017

(54) SYSTEM AND METHOD FOR HEATING FERRITE MAGNET MOTORS FOR LOW TEMPERATURES

(71) Applicant: General Electric Company, Schenectady, NY (US)

(72) Inventors: Patel Bhageerath Reddy, Niskayuna, NY (US); Ayman Mohamed Fawzi El-Refaie, Niskayuna, NY (US); Kum-Kang Huh, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 890 days.

(21) Appl. No.: 14/063,547

(22) Filed: Oct. 25, 2013

(65) Prior Publication Data

US 2015/0115757 A1    Apr. 30, 2015

(51) Int. Cl.
*H02K 1/30* (2006.01)
*H02K 21/12* (2006.01)
(Continued)

(52) U.S. Cl.
CPC .......... *H02K 21/12* (2013.01); *H02K 1/2766* (2013.01); *H02K 1/30* (2013.01); *H02K 15/12* (2013.01);
(Continued)

(58) Field of Classification Search
CPC ........ H02K 1/27; H02K 1/146; H02K 1/2733; H02K 1/2773; H02K 21/16; H02K 29/03; H02K 2213/03
(Continued)

(56) References Cited

U.S. PATENT DOCUMENTS 3,717,804 A    2/1973   Dikinis et al.
3,743,866 A *  7/1973   Pirc .................. H02N 10/00
                                                 310/306
(Continued)

FOREIGN PATENT DOCUMENTS

CN    103117635 A    5/2013
CN    103312262 A    9/2013
(Continued)

OTHER PUBLICATIONS

Richter et al., "The Ferrite Permanent Magnet AC Motor—A Technical and Economical Assessment", IEEE Transactions on Industry Applications, vol. IA-21, No. 4, May/Jun. 1985, pp. 644-650.
(Continued)

*Primary Examiner* — Terrance Kenerly
(74) *Attorney, Agent, or Firm* — Meager Emanuel Laks Goldberg & Liao, LLP (57) ABSTRACT

A system and method for heating ferrite permanent magnets in an electrical machine is disclosed. The permanent magnet machine includes a stator assembly and a rotor assembly, with a plurality of ferrite permanent magnets disposed within the stator assembly or the rotor assembly to generate a magnetic field that interacts with a stator magnetic field to produce a torque. A controller of the electrical machine is programmed to cause a primary field current to be applied to the stator windings to generate the stator magnetic field, so as to cause the rotor assembly to rotate relative to the stator assembly. The controller is further programmed to cause a secondary current to be applied to the stator windings to selectively generate a secondary magnetic field, the secondary magnetic field inducing eddy currents in at least one of the stator assembly and the rotor assembly to heat the ferrite permanent magnets.

17 Claims, 6 Drawing Sheets

(51) Int. Cl.
  *H02K 15/12* (2006.01)
  *H02K 21/26* (2006.01)
  *H02K 21/44* (2006.01)
  *H02K 1/27* (2006.01)

(52) U.S. Cl.
  CPC .......... *H02K 15/125* (2013.01); *H02K 21/26* (2013.01); *H02K 21/44* (2013.01)

(58) Field of Classification Search
  USPC .................................................. 310/156.48
  See application file for complete search history.

(56) References Cited

U.S. PATENT DOCUMENTS

| | | | |
|---|---|---|---|
| 4,139,790 | A | 2/1979 | Steen |
| 4,651,066 | A | 3/1987 | Gritter et al. |
| 4,710,667 | A | 12/1987 | Whiteley |
| 4,727,326 | A | 2/1988 | Kaplan et al. |
| 4,879,497 | A | 11/1989 | Meyer et al. |
| 5,311,125 | A | 5/1994 | Krause et al. |
| 5,652,517 | A | 7/1997 | Maki et al. |
| 5,747,909 | A | 5/1998 | Syverson et al. |
| 6,043,632 | A | 3/2000 | Maehara et al. |
| 6,359,359 | B1 | 3/2002 | Miura et al. |
| 6,504,275 | B2* | 1/2003 | Nondahl ............... H02K 11/20 310/261.1 |
| 6,606,019 | B1 | 8/2003 | Ohashi |
| 6,741,002 | B2 | 5/2004 | Nishiyama et al. |
| 6,828,889 | B1 | 12/2004 | Zaput |
| 6,838,964 | B1 | 1/2005 | Knight et al. |
| 6,903,525 | B2 | 6/2005 | Carson et al. |
| 7,099,793 | B2 | 8/2006 | Rechberger |
| 7,258,526 | B2 | 8/2007 | Dooley et al. |
| 7,304,478 | B2 | 12/2007 | Tsuda et al. |
| 7,425,786 | B2 | 9/2008 | Hino et al. |
| 7,486,038 | B2 | 2/2009 | Amagasa |
| 7,579,742 | B1 | 8/2009 | Rittenhouse |
| 7,804,261 | B2 | 9/2010 | Atarashi et al. |
| 7,821,365 | B2 | 10/2010 | Komura et al. |
| 7,839,108 | B2 | 11/2010 | Patel et al. |
| 7,843,100 | B2 | 11/2010 | Blissenbach et al. |
| 7,962,019 | B2 | 6/2011 | Seeber et al. |
| 8,013,565 | B2 | 9/2011 | Miura |
| 8,258,658 | B2 | 9/2012 | Heitzler et al. |
| 8,384,504 | B2 | 2/2013 | Diederichs et al. |
| 8,421,391 | B2 | 4/2013 | Yeh et al. |
| 8,732,612 | B2 | 5/2014 | Hoerentrup et al. |
| 9,160,206 | B2 | 10/2015 | Potoradi et al. |
| 9,160,272 | B2 | 10/2015 | Tachibana et al. |
| 2002/0157408 | A1 | 10/2002 | Egawa et al. |
| 2005/0046533 | A1* | 3/2005 | Chell ................... H01F 7/0205 335/306 |
| 2006/0266575 | A1 | 11/2006 | Nagase et al. |
| 2007/0170801 | A1* | 7/2007 | Sato ..................... H01F 1/0577 310/156.43 |
| 2008/0238234 | A1* | 10/2008 | Saban ................... H02K 1/278 310/156.28 |
| 2008/0303368 | A1 | 12/2008 | Rahman et al. |
| 2009/0179602 | A1 | 7/2009 | Hayashi et al. |
| 2010/0001821 | A1 | 1/2010 | Diederichs et al. |
| 2010/0176674 | A1* | 7/2010 | Post ..................... H02K 49/102 310/103 |
| 2010/0188083 | A1 | 7/2010 | Cao et al. |
| 2010/0253181 | A1* | 10/2010 | Hazelwood ............ H01L 37/04 310/306 |
| 2011/0050141 | A1 | 3/2011 | Yeh et al. |
| 2011/0157752 | A1 | 6/2011 | Sakanobe et al. |
| 2011/0234180 | A1 | 9/2011 | Cullen et al. |
| 2011/0241467 | A1 | 10/2011 | Fujioka et al. |
| 2012/0299409 | A1 | 11/2012 | Choi et al. |
| 2013/0207498 | A1 | 8/2013 | Kusase et al. |
| 2013/0249448 | A1 | 9/2013 | Kobayashi et al. |
| 2014/0054986 | A1 | 2/2014 | Hirai et al. |
| 2014/0096503 | A1 | 4/2014 | Ribarov et al. |
| 2014/0187382 | A1 | 7/2014 | Kang et al. |
| 2014/0350762 | A1 | 11/2014 | Wesenberg et al. |
| 2015/0115757 | A1 | 4/2015 | Reddy et al. |
| 2015/0188480 | A1 | 7/2015 | Liu et al. |

FOREIGN PATENT DOCUMENTS

| | | |
|---|---|---|
| DE | 10045291 A1 | 3/2002 |
| DE | 102011121272 A1 | 6/2013 |
| EP | 0573658 A1 | 12/1993 |
| EP | 2463992 A1 | 6/2012 |
| JP | 05184192 A | 7/1993 |
| JP | 2005127406 A | 5/2005 |
| JP | 2006094590 A | 4/2006 |
| JP | 2013009542 A | 1/2013 |
| KR | 20140086303 A | 7/2014 |
| WO | 03016794 A1 | 2/2003 |
| WO | 2013009542 A | 1/2013 |
| WO | 2013108877 A1 | 7/2013 |
| WO | 2014016679 A1 | 1/2014 |

OTHER PUBLICATIONS

Sanada et al., "Rotor Structure for Reducing Demagnetization of Magnet in a PMASynRM with Ferrite Permanent Magnet and Its Characteristics", IEEE Energy Conversion Congress and Exposition (ECCE), Sep. 17-22, 2011, Phoenix, AZ, pp. 4189-4194.

European Search Report and Opinion issued in connection with corresponding EP Application No. 14190298.1 on Nov. 16, 2015.

US Non-Final Office Action issued in connection with Related U.S. Appl. No. 14/473,216 on Aug. 17, 2016.

European Search Report issued in connection with corresponding EP Application No. 15182787.0 on May 13, 2016.

* cited by examiner

SYSTEM AND METHOD FOR HEATING FERRITE MAGNET MOTORS FOR LOW TEMPERATURES

GOVERNMENT LICENSE RIGHTS

This invention was made with Government support under contract number DE-EE0005573 awarded by the United States Department of Energy. The Government has certain rights in the invention.

BACKGROUND OF THE INVENTION

Embodiments of the invention relate generally to electrical machines and, more particularly, to permanent magnet electrical machines that include ferrite permanent magnets, with the stator and/or rotor in the electrical machine being heated in order to prevent demagnetization of the ferrite permanent magnets.

The usage of electrical machines in various industries has continued to become more prevalent in numerous industrial, commercial, and transportation industries over time. In an attempt to realize high performance in electric machines, the choice of using permanent magnet (PM) materials is getting more and more popular for many applications. In such machines, the PMs can either replace electromagnets in traditional designs, or novel topologies can be developed to make the best use of the properties and characteristics of PMs.

One PM electrical machine topology that has been developed is referred to as "stator permanent magnet machines," which are electrical machines that are designed such that the PMs in the machine are positioned on the stator. Stator permanent magnet machines can thus refer to, but are not limited to, permanent magnet flux switching machines, permanent magnet flux reversal machines, and doubly-salient permanent magnet machines. Another PM electrical machine topology that has been developed is referred to as "internal permanent magnet (IPM) machines," which are electrical machines that are designed such that the PMs in the machine are embedded inside multiple laminations of a rotor. IPM machines can thus refer to IPM motors or generators widely used in a variety of applications, including aircraft, automobiles and industrial usage.

One issue that is taken into consideration when constructing and operating a PM electrical machine is demagnetization of the PMs. Depending on the type of PMs employed, demagnetization of the PMs can occur if the electrical machine is exposed to extremely high or extremely low temperatures. For example, if the PMs are rare earth magnets, exposure of the PMs to extremely high temperatures can make the PMs more susceptible to demagnetization. Conversely, if the PMs are ferrite magnets, exposure of the PMs to low temperatures (e.g., −40° to 60° C.) can make the PMs more susceptible to demagnetization.

It is recognized that the use of ferrite magnets in PM electrical machines can provide cost savings as compared to the use of rare earth magnets, and thus the use of ferrite magnets may be desirable in such PM electrical machines. While ferrite magnets are more prone to demagenetization at lower temperatures compared to rare earth magnets, they are less prone to demagnetization at higher temperatures than rare earth magnets. Thus, if solutions can be provided for preventing demagnetization of ferrite magnets at low temperatures, ferrite magnet PM machines can be a desirable alternative to rare earth magnet PM machines.

Therefore, it is desirable to provide a system and method for preventing the demagnetization of ferrite magnets in a PM machine. It is further desirable to provide a ferrite magnet PM machine useable over a wide range of ambient temperatures and that exhibits improved resistance to corrosion and improved stability.

BRIEF DESCRIPTION OF THE INVENTION

In accordance with one aspect of the invention, a permanent magnet machine includes a stator assembly having a stator core including a plurality of stator teeth and stator windings wound about the plurality of stator teeth to generate a stator magnetic field when excited with alternating currents. The permanent magnet machine also includes a rotor assembly configured to rotate relative to the stator assembly and that is separated from the stator assembly by an air gap, a plurality of ferrite permanent magnets disposed within one of the stator assembly or the rotor assembly configured to generate a magnetic field that interacts with the stator magnetic field to produce a torque, and a controller programmed to cause a primary field current to be applied to the stator windings to generate the stator magnetic field, so as to cause the rotor assembly to rotate relative to the stator assembly and selectively cause a secondary current to be applied to the stator windings to selectively generate a secondary magnetic field, the secondary magnetic field inducing eddy currents in at least one of the stator assembly and the rotor assembly to heat the plurality of ferrite permanent magnets.

In accordance with another aspect of the invention, a method for heating a ferrite permanent magnet electrical machine includes providing a stator assembly having a stator core including a plurality of stator teeth and stator windings wound about the plurality of stator teeth to generate a stator magnetic field when excited with alternating currents, providing a rotor assembly configured to rotate relative to the stator assembly while separated from the stator core by an air gap, and providing a plurality of ferrite permanent magnets configured to generate a magnetic field that interacts with the stator magnetic field to produce a torque, the plurality of ferrite permanent magnets being positioned on either the stator assembly or the rotor assembly. The method also includes selectively heating the plurality of ferrite permanent magnets in order to prevent demagnetization of the plurality of ferrite permanent magnets, wherein selectively heating the plurality of ferrite permanent magnets comprises one or more of heating the plurality of ferrite permanent magnets by applying a secondary current to the stator windings to selectively generate a secondary magnetic field by inducing eddy currents in at least one of the stator assembly and the rotor assembly to heat the plurality of ferrite permanent magnets, heating the plurality of ferrite permanent magnets by inducing eddy currents in a ring element positioned on or in the rotor assembly to heat up the ring element, or heating the plurality of ferrite permanent magnets by applying a magnetic field to a plurality of magnetocaloric elements positioned adjacent the plurality of ferrite permanent magnets, wherein the plurality of magnetocaloric elements heat up when subjected to the magnetic field.

In accordance with yet another aspect of the invention, in the ring element responsive to application of a pulsating current to the stator windings, so as to heat up the ring element, and a plurality of magnetocaloric an internal permanent magnet machine includes a stator assembly having a stator core including a plurality of stator teeth and stator windings wound about the plurality of stator teeth to generate a stator magnetic field when excited with alternating currents. The internal permanent magnet machine also includes a rotor assembly disposed within a cavity defined by the stator assembly and configured to be separated from the stator core by an air gap and rotate relative to the stator assembly, a plurality of ferrite permanent magnets positioned in the rotor assembly and configured to generate a magnetic field that interacts with the stator magnetic field to produce a torque, and a heating element configured to provide pre-heating to the plurality of ferrite permanent magnets. The heating element comprises one of a ring element formed of an electrically conductive material and positioned on or within the rotor assembly, wherein eddy currents are induced elements positioned adjacent the plurality of ferrite permanent magnets, the plurality of magnetocaloric elements configured to heat-up when subjected to a magnetic field.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION OF THE PREFERRED EMBODIMENT

Embodiments of the invention are directed towards permanent magnet electrical machines that include ferrite permanent magnets, with the stator and/or rotor in the electrical machine being heated in order to prevent demagnetization of the ferrite permanent magnets. According to embodiments of the invention, various control schemes and/or components are used to implement the heating of the ferrite permanent magnets. Such control schemes and/or components can be utilized in both stator permanent magnet machines and internal permanent magnet machines. Additionally, such control schemes and/or components can be utilized in both "internal electrical machines," where the rotor is positioned inside of the stator, or "external electrical machines" or "inside-out electrical machines," where the rotor is positioned inside of the stator.

Figure 1:
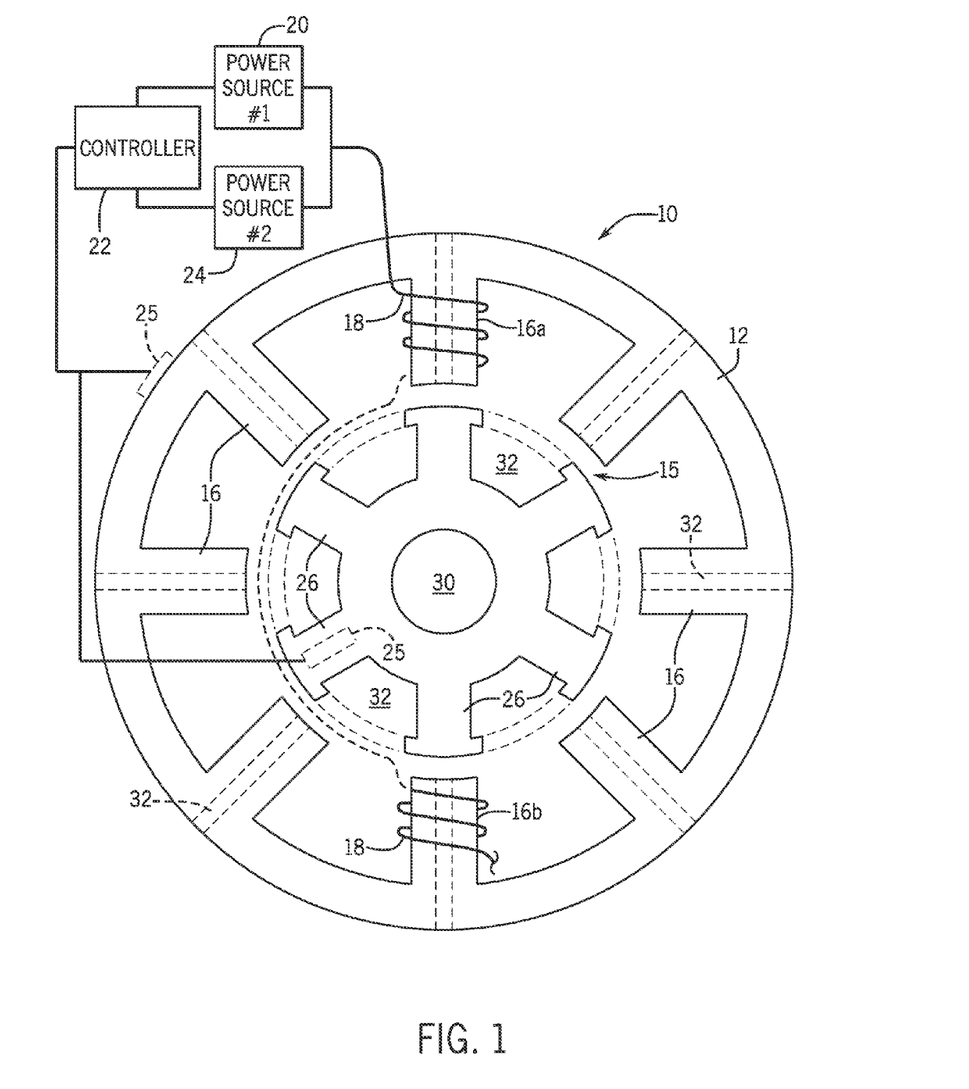
FIGS. 1 and 2 are views of a permanent magnet machine in accordance with an embodiment of the invention.
Figure 2:
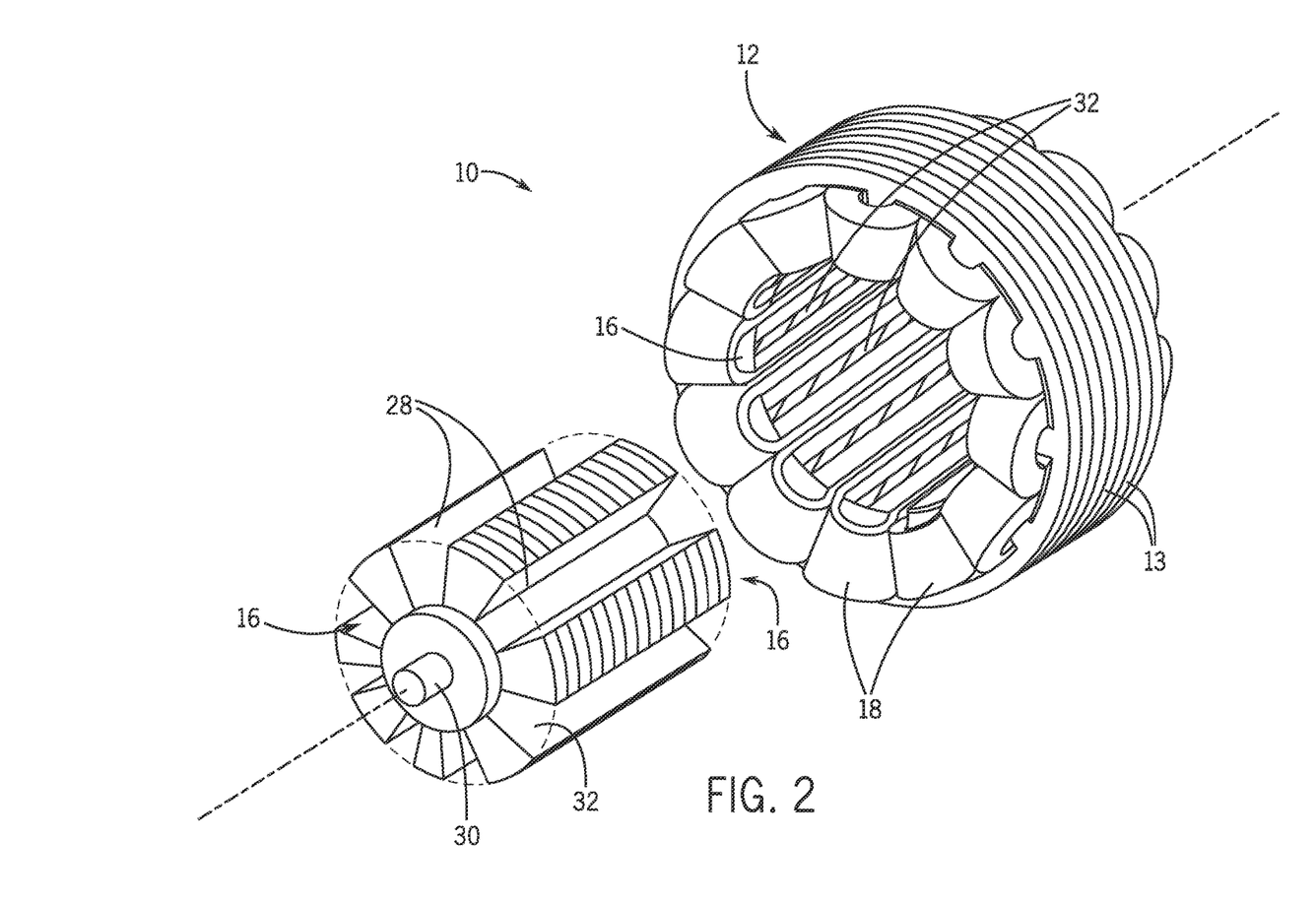

Referring to FIGS. 1 and 2, a typical electrical machine 10 that may benefit from embodiments of the present invention is shown. The electrical machine 10 includes a stator 12 (e.g., laminated iron stator formed of laminations 13) that surrounds a rotor 14 in the radial direction and extends axially along rotor 14, with an air-gap 15 being present between the stator 12 and rotor 14. The stator 12 further includes a plurality of stator poles 16, with each stator pole 16 being matched with a radially opposite stator pole to form a stator pole pair. Stator pole pairs 16a and 16b are wound with a phase winding 18 that may be driven in a conventional manner via a power source 20 (e.g., controlled AC power source) that is controllable by a controller 22. Separate phase windings 18, are also included on the other stator poles 16 in a like manner. According to embodiments of the invention, an additional power source 24 is also employed to provide a separate current to the phase winding(s) 18, in order to enable heating of the stator and/or rotor of the electrical machine 10—as will be explained in greater detail below. Furthermore, temperature measuring devices or sensors 25—such as thermocouples—can be included with electrical machine 10 that are configured to monitor a temperature of the electrical machine (i.e., of permanent magnets in the machine, as will be explained below), with the temperature sensors 25 being positioned on at least one of the stator assembly or the rotor assembly, as shown in phantom in FIG. 1.

As shown in FIG. 1, the rotor 14 is formed as a salient rotor having a plurality of salient pole pieces 26, although it is recognized that rotor could have an alternate construction (e.g., round rotor). According to one embodiment, the rotor 14 is constructed of a stack of integral laminations 28, as can be seen in the view of the rotor 14 provided in FIG. 2, although it is recognized that the rotor core could also be formed as a single piece—with the core being machined out of steel or formed from sintered magnetic materials, for example. The rotor 14 includes multiple projections/teeth 26 acting as salient magnetic poles. A central portion of the rotor 14 includes a rotor bore through which a drive shaft 30 may be inserted, about which the rotor 14 can rotate.

The exact structure of the electrical machine may take one of numerous forms, according to embodiments of the invention. For example, the electrical machine may be configured as a stator permanent magnet machine (e.g., permanent magnet flux switching machine, permanent magnet flux reversal machine, or doubly-salient permanent magnet machine, for example) that includes ferrite permanent magnets 32 (shown in phantom) embedded in the stator. In such stator permanent magnet machines, electric current in the windings 18, interacts with magnetic fields associated with the ferrite magnets 32 to cause rotation of the rotor 14. The electrical machine may be instead be configured as an internal permanent magnet (IPM) machine (e.g., spoke rotor permanent magnet machine) that includes ferrite permanent magnets 32 (shown in phantom) affixed to or embedded in the rotor. In such IPM machines, electric current in the windings 18, interacts with magnetic fields associated with the ferrite magnets 32 to cause rotation of the rotor 14.

More specific examples of various ferrite permanent magnet electrical machines are shown in FIGS. 3-7 that may be implemented according to embodiments of the invention. In each of the permanent magnet electrical machines of FIGS. 3-7, the stator and/or rotor are heated in order to prevent demagnetization of the ferrite permanent magnets at low temperatures, with a control scheme and/or component in the machine being used to implement the heating of the ferrite permanent magnets.

Figure 3:
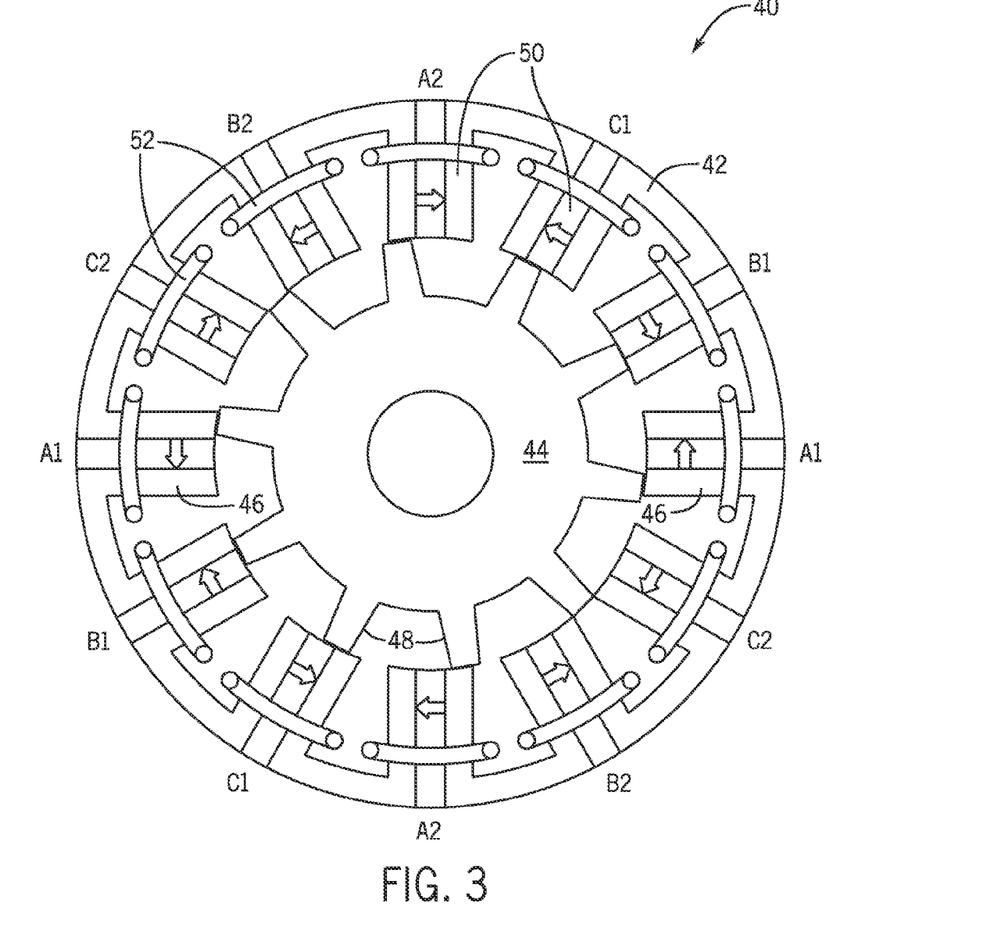
FIG. 3 is a schematic view of a flux-switching permanent magnet machine in accordance with an embodiment of the invention.

Referring first to FIG. 3, a schematic plan view of a flux-switching permanent magnet machine 40 is shown according to an embodiment of the invention. In the flux-switching permanent magnet machine 40, a stator 42 is shown positioned relative to a rotor 44, with the stator 42 and the rotor 44 each having respective teeth 46, 48. A permanent magnet 50 is embedded on each tooth of the stator lamination 42. The rotor 44 and the stator 42 have different numbers of teeth, and therefore for any orientation of the rotor 44 relative to the stator 42, certain ones of the rotor teeth are offset relative to the closest stator teeth. As alternating current is passed through stator windings 52, a variable magnetic field is generated that is superimposed over the fixed magnetic field resulting from the permanent magnets 50. The resultant combined magnetic field varies with time, causing the rotor 44 to rotate within the stator 42 as it attempts to bring the rotor teeth 48 to a position of minimum reluctance with respect to the stator teeth 46.

Figure 4:
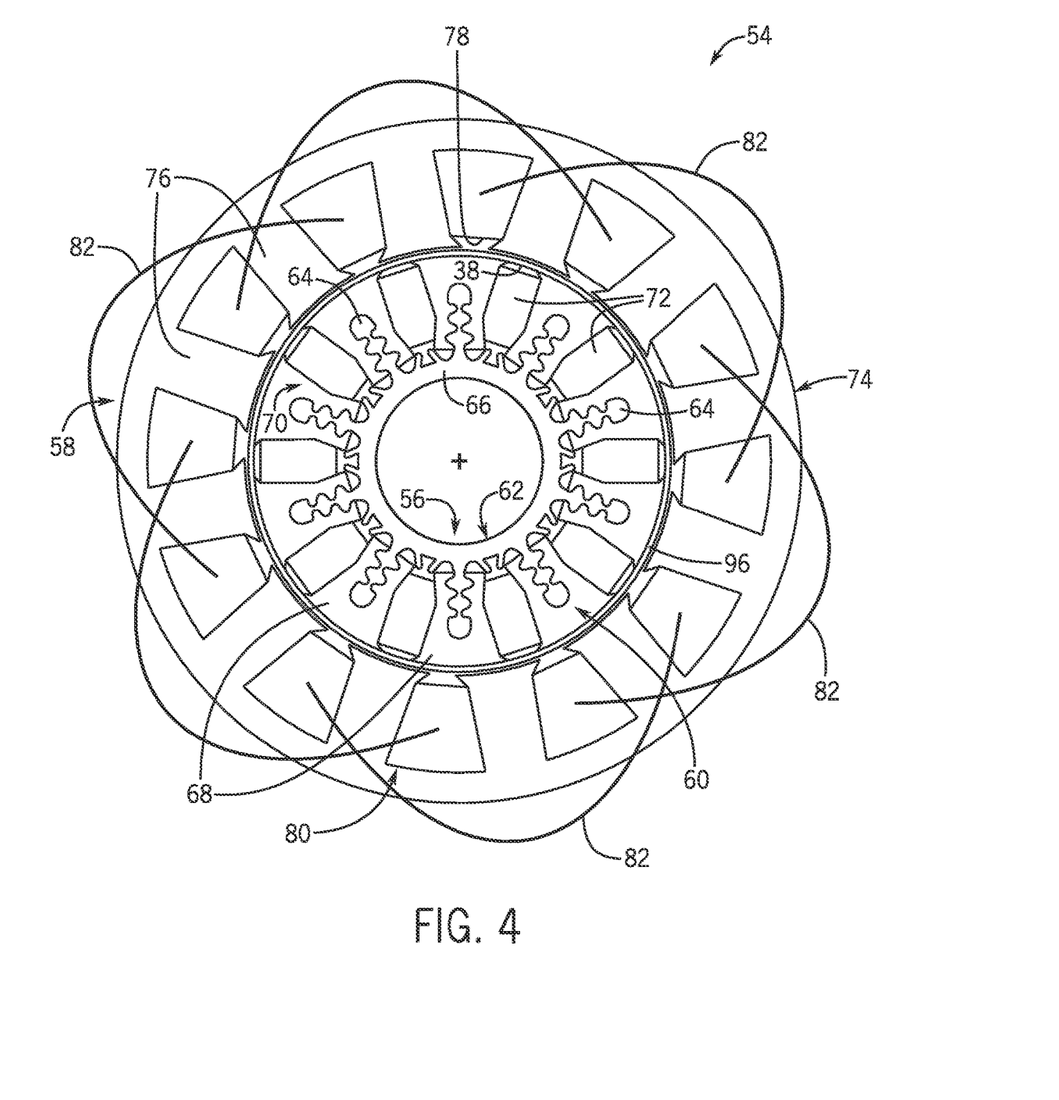
FIG. 4 is a schematic view of a spoke rotor permanent magnet machine in accordance with an embodiment of the invention.

Referring to FIG. 4, an internal permanent magnet (IPM) machine 54 including a rotor assembly 56 and a stator assembly 58 is shown that is configured as a segmented spoke rotor permanent magnet machine. The rotor assembly 56 includes a rotor core 60 disposed on a rotor shaft 62, with the rotor core 60 being configured to rotate about a longitudinal axis of the IPM machine 54. The shaft 62 is constructed to have multiple protrusions 64 formed on a main shaft body 66, with the protrusions 64 being formed circumferentially about the main shaft body 66 and along an axial length of the main shaft body 66.

As shown in FIG. 4, the rotor core 60 is constructed as a segmented rotor formed from a plurality of separate salient rotor poles 68. Each of the rotor poles 68 is formed from a stack of laminations (not shown) that is disposed on a respective protrusion 22. The stacks of laminations forming the rotor poles 68 are arranged (i.e., dovetailed) circumferentially around the shaft 62, such that interpolar gaps 70 (i.e., dovetailed recess) are formed between adjacent rotor poles 68. Permanent magnets 72 are disposed in the interpolar gaps 70, with the permanent magnets 72 generating a magnetic field to be radially directed in an air gap between the rotor 56 and the stator 58. The magnetic field generated by the permanent magnets 72 further interacts with a stator magnetic field to produce a torque.

The stator assembly 58 of the IPM machine 10 includes a stator core 74 having multiple stator teeth 76 arranged circumferentially so as to form a cavity 78 at a center of the stator core 74. The stator assembly 58 generates a magnetic field and extends along the longitudinal axis with an inner surface defining the cavity 78. The rotor assembly 56, as discussed above, is disposed within the cavity 78 defined by the stator core 40. The stator assembly 58 includes stator slots 80 for receiving distributed windings 82 therein that are wound on the teeth 76. The windings 82 may be formed as copper coils, for example, and function to produce a fairly sinusoidal rotating field in the air gap when excited by AC currents.

Figure 5:
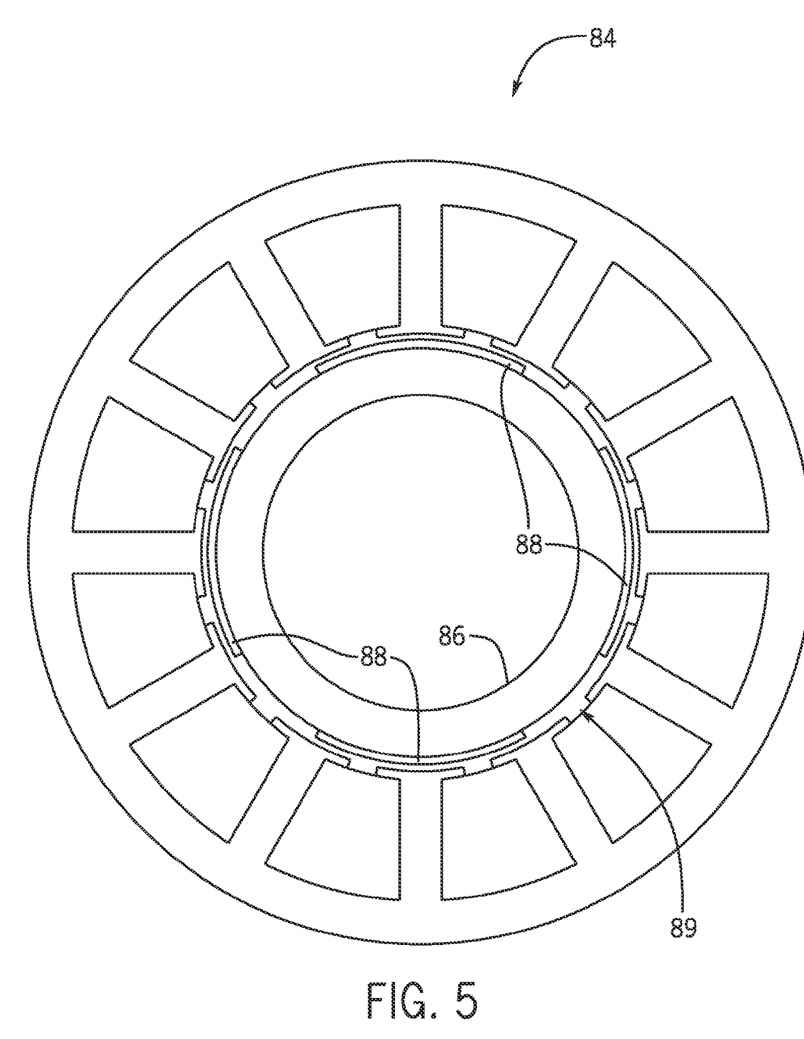
FIG. 5 is a schematic view of a surface permanent magnet machine in accordance with an embodiment of the invention.
Figure 6:
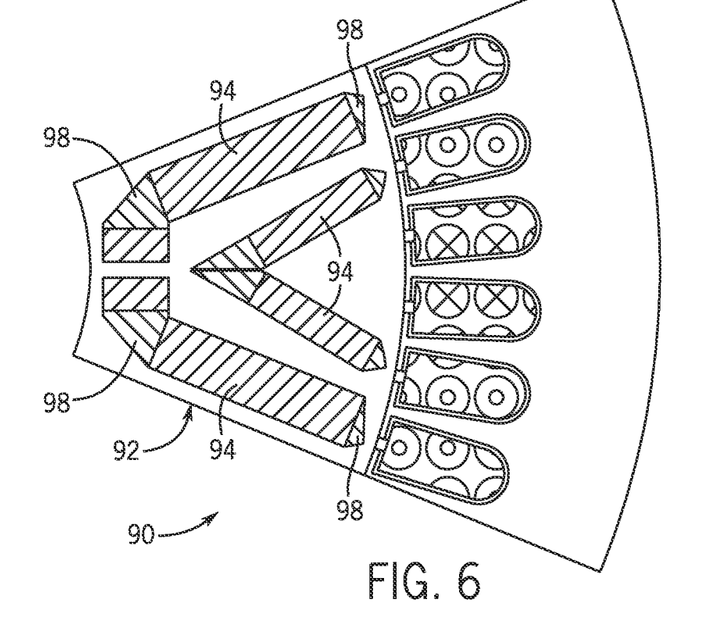
FIGS. 6 and 7 are schematic views of a portion of an internal permanent magnet (IPM) machine in accordance with an embodiment of the invention.
Figure 7:
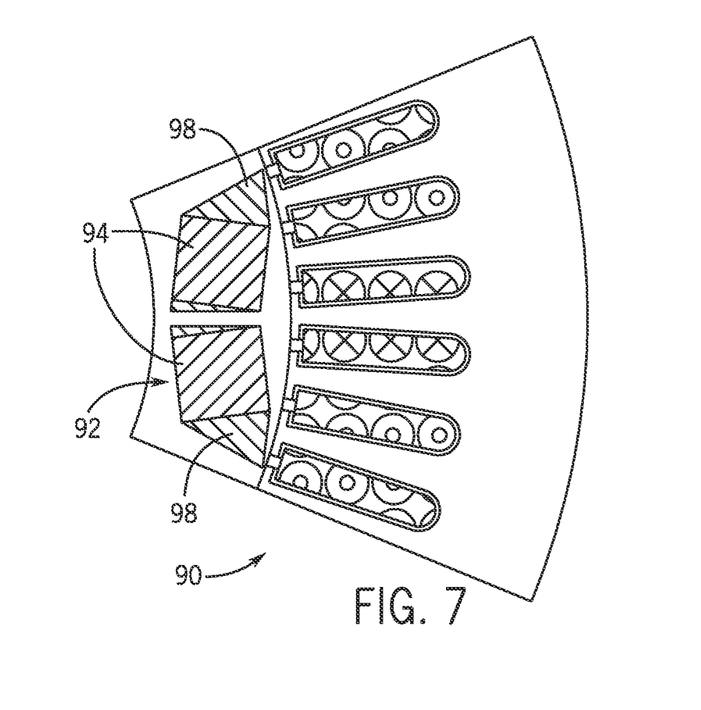

Referring now to FIGS. 5-7, additional IPM machines are shown that incorporate a generally round rotor (i.e., no salient rotor poles thereon). FIG. 5 illustrates an IPM machine 84 with a rotor 86 having surface permanent magnets 88 (SPMs) affixed/embedded to an outer surface 89 thereof. FIGS. 6 and 7 each show a portion of an IPM machine 90 with a rotor 92 having permanent magnets 94 embedded in the rotor (i.e., within the stack of rotor laminations), with FIG. 6 illustrating a rotor 92 having ferrite permanent magnets 94 embedded therein in a U-shaped pattern and a V-shaped pattern and FIG. 7 illustrating a rotor 92 having ferrite permanent magnets 94 embedded therein in a V-shaped pattern.

It is recognized that FIGS. 3-7 are meant to only illustrate examples of electrical machines that can benefit from incorporating embodiments of the invention. That is, embodiments of the invention can be implemented in a plurality of different types of ferrite permanent magnet electrical machines. As such, embodiments of the invention are not meant to be limited only to the types of electrical machines shown and described in FIGS. 3-7.

According to exemplary embodiments of the invention, each of the permanent magnet electrical machines shown in FIGS. 1-7 may have its stator and/or rotor heated in order to prevent demagnetization of the ferrite permanent magnets therein that might occur at low temperatures. That is, it is recognized that exposure of the ferrite PMs to low temperatures (e.g., −40° to 60° C.)—such as might be present during machine start-up—can make the PMs more susceptible to demagnetization. Embodiments of the invention thus provide a control scheme and/or component(s) in the machine that are employed to implement the heating of the ferrite permanent magnets, with such heating being desirable to "pre-heat" the magnets prior to normal operation of the electrical machine and/or during early operation of the electrical machine.

Referring back to FIG. 1, according to one embodiment of the invention, controller 22 is programmed to cause heat to be generated in the electrical machine 10 in order to heat the ferrite permanent magnets 32 therein, which may be included in either the stator 12 or the rotor 14—depending on the type of electrical machine. To generate this heat, controller 22 is programmed to cause power source 24 to apply a secondary current to the stator windings 18 to selectively generate a secondary magnetic field configured to induce eddy currents that serve to heat the plurality of ferrite permanent magnets 32. The secondary current applied by power source 24 is separate from (either applied in lieu of or in combination with) a primary field current that is applied to the stator windings 18 by power source 20 that generates the stator magnetic field that causes the rotor 14 to rotate relative to the stator 12. That is, the secondary current applied to the stator windings 18 can be superimposed on the applied primary field current or applied to the stator windings 18 absent the primary field current being applied.

According to one embodiment, the secondary current applied to windings 18 by power source 24 is an alternating current waveform having a frequency in the vicinity of the primary field current waveforms on the stator 12 (but not equal to the primary field current), with the secondary current setting up a pulsating field on the stator 12. This creates a magnetic field in the air-gap 15 between the stator and rotor and in the stator 12 and/or rotor 14, which induces eddy currents in the stator/rotor laminations 13, 28 and the ferrite permanent magnets 32—located in either the stator or rotor—so as to create heat.

According to another embodiment, the secondary current applied to windings 18 by power source 24 is a high frequency current (e.g., 10 Hz and higher than the frequency of the primary current). The high frequency secondary current produces magnetic fields that may interact with the stator/rotor laminations 13, 28 and/or the ferrite permanent magnets 32 to induce eddy currents therein. These eddy currents create heat in the stator 12 and/or rotor 14 that is transferred to the ferrite permanent magnets 32.

According to another embodiment of the invention, and with reference now to FIG. 4 as an example, a separate component is included in the permanent magnet machine 54 in order to promote heating of the ferrite permanent magnets 72—with the component being in the form of a ring element 96 formed of an electrically conductive material (e.g., aluminum, copper, or a copper alloy) welded or brazed together to form the ring, wherein eddy currents are induced in the ring element 96 responsive to application of a secondary current to the stator windings 82. As shown in FIG. 4, the ring element 96 is positioned on an outer surface of the rotor assembly 56 such that the ring element 96 is positioned adjacent the air gap between the stator 58 and the rotor 56. It is recognized, however, that the ring element 96 could instead be positioned in opening(s) defined by the rotor (i.e., in opening formed in rotor laminations), according to another embodiment of the invention. According to embodiments of the invention, the ring element 96 can be shorted to the stator 58 or connected using an external resistive or inductive element. It is noted that the ring element 96 described above and shown in FIG. 4 is not to be confused with the end ring of a bird-cage rotor such as might be found in an induction motor, as the ring element 96 is a component distinct from such an end ring—with the ring element 96 functioning to have eddy currents induced therein responsive to application of the secondary current to the stator windings 82.

In operation, the ring element 96 can be heated up by way of pulsating currents in the stator 58. That is, eddy currents are induced in the ring element 96 when there is a presence of pulsating currents in the stator. These pulsating currents are generated by a controller (e.g., controller 22 in FIG. 1) associated with the electrical machine 54, with the controller being programmed to cause a power source to apply a controlled secondary current to the stator windings 82. The heat generated in the ring element 96 by way of eddy currents induced therein is transferred to the ferrite permanent magnets 72, to provide heating thereto.

While ring element 96 is shown with respect to the spoke rotor IPM machine 54 of FIG. 4, it is recognized that the ring element 96 could be included on various IPM machines of various construction in order to provide heating to the ferrite permanent magnets therein. The ring element 96 may be formed/positioned in or on the rotor so as to be in proximity to the permanent magnets, to improve the rate and efficiency of heat transfer from the ring element to the permanent magnets.

According to another embodiment of the invention, and with reference now to FIGS. 6 and 7 as an example, separate components are included in the permanent magnet machine 90 in order to promote heating of the ferrite permanent magnets—with the components 90 being in the form of elements 98 formed of a magnetocaloric material (e.g., alloys of gadolinium, germanium and silicon) that produce heat when subject to a magnetic field. As shown in FIGS. 6 and 7, the magnetocaloric elements 98 are positioned within the rotor 92, such as in openings/air pockets present in the rotor lamination stack, and such that the magnetocaloric elements 98 are positioned in proximity to or adjacent to the ferrite permanent magnets 94.

In operation, the magnetocaloric elements 98 can be heated up by way of exciting the stator with DC or pulsating currents. That is, a controller (e.g., controller 22 in FIG. 1) associated with the electrical machine 90 causes a power source to apply a controlled secondary current to stator windings in order to generate a magnetic field to which the magnetocaloric elements 98 are subjected—thereby heating up the magnetocaloric elements 98. The heat generated in the magnetocaloric elements 98 by way of the magnetic field is transferred to the ferrite permanent magnets 94, to provide heating thereto.

While magnetocaloric elements 98 are shown with respect to the IPM machines 90 of FIGS. 6 and 7, it is recognized that the magnetocaloric elements 98 could be included on various permanent magnet machines of various construction—including both stator permanent magnet machines and IPM machines—in order to provide heating to the ferrite permanent magnets therein. The magnetocaloric elements 98 may be positioned in the stator or the rotor so as to be in proximity to the permanent magnets, to improve the rate and efficiency of heat transfer from the magnetocaloric elements to the permanent magnets.

With reference back now again to FIG. 1, it is recognized that the heating of the ferrite permanent magnets 32 therein may be selectively performed as determined by a condition of the electrical machine 10. That is, as stated above, heating of the ferrite permanent magnets 32 may be desirable when the electrical machine 10 is at an operating temperature of −40° to 60° C., for example, in order to prevent demagnetization of the ferrite permanent magnets 32. Such temperatures may be present during machine start-up of the electrical machine 10, and thus it is desirable to be able to selectively generate heat in the electrical machine to "preheat" the ferrite permanent magnets 32 prior to normal operation of the electrical machine and/or during early operation of the electrical machine.

To determine when pre-heating of the electrical machine 10 (i.e., of the ferrite permanent magnets 32) is necessary/desired, temperature measuring devices or mechanisms, such as thermocouples 25, are in operative communication with controller 22 and provide feedback thereto regarding a temperature of the stator 12 and/or rotor 14 of the electrical machine 10—i.e., of the permanent magnets 32 therein. The controller 22 is programmed to receive the feedback from the thermocouples 25 regarding the temperature of the electrical machine 10 and compare the measured temperature to a threshold temperature setting in order to determine if pre-heating of the ferrite permanent magnets 32 is desired in order to prevent possible demagnetization thereof. The threshold temperature setting may, for example, be set at 60° C. If the measured temperature is below the threshold temperature, then the controller 22 causes a secondary current to be applied (by power source 24) to the stator windings 18 to generate a secondary magnetic field and thereby induce eddy currents in at least one of the stator 12 and the rotor assembly 14 to heat the plurality of ferrite permanent magnets 32. According to an embodiment of the invention, the secondary current can be applied a few milliseconds to a few seconds before applying a full load field current to the electrical machine 10 in order to preheat the permanent magnets 32. The primary field current can then be applied for start-up of the electrical machine 10, with the secondary current continuing to be applied before being turned off after a certain period of time, such as when a measured temperature is above the minimum threshold temperature.

While exemplary embodiments of the invention are set forth above with respect to various "internal electrical machines," where the rotor is positioned inside of the stator, additional embodiments of the invention may be directed to "external electrical machines" or "inside-out electrical machines," where the rotor is positioned about the stator, and it is recognized that such electrical machines are also considered to be within the scope of the invention. In this such embodiments, the rotor having the permanent magnets can be exterior to the stator containing the windings, such as might typically be found in washing machine motors, for example.

Beneficially, embodiments of the invention thus provide a system and method for heating ferrite permanent magnets in an electrical machine in order to prevent demagnetization thereof. A control scheme and/or components are implemented to heat the ferrite permanent magnets, with the control scheme and/or components able to be utilized in both stator permanent magnet machines and internal permanent magnet machines. The control scheme and components provide for use of ferrite permanent magnet electrical machines in a wide range of ambient temperatures, improve resistance to corrosion, and improve stability.

Therefore, according to one embodiment of the invention, a permanent magnet machine includes a stator assembly having a stator core including a plurality of stator teeth and stator windings wound about the plurality of stator teeth to generate a stator magnetic field when excited with alternating currents. The permanent magnet machine also includes a rotor assembly configured to rotate relative to the stator assembly and that is separated from the stator assembly by an air gap, a plurality of ferrite permanent magnets disposed within one of the stator assembly or the rotor assembly configured to generate a magnetic field that interacts with the stator magnetic field to produce a torque, and a controller programmed to cause a primary field current to be applied to the stator windings to generate the stator magnetic field, so as to cause the rotor assembly to rotate relative to the stator assembly and selectively cause a secondary current to be applied to the stator windings to selectively generate a secondary magnetic field, the secondary magnetic field inducing eddy currents in at least one of the stator assembly and the rotor assembly to heat the plurality of ferrite permanent magnets.

According to another embodiment of the invention, a method for heating a ferrite permanent magnet electrical machine includes providing a stator assembly having a stator core including a plurality of stator teeth and stator windings wound about the plurality of stator teeth to generate a stator magnetic field when excited with alternating currents, providing a rotor assembly configured to rotate relative to the stator assembly while separated from the stator core by an air gap, and providing a plurality of ferrite permanent magnets configured to generate a magnetic field that interacts with the stator magnetic field to produce a torque, the plurality of ferrite permanent magnets being positioned on either the stator assembly or the rotor assembly. The method also includes selectively heating the plurality of ferrite permanent magnets in order to prevent demagnetization of the plurality of ferrite permanent magnets, wherein selectively heating the plurality of ferrite permanent magnets comprises one or more of heating the plurality of ferrite permanent magnets by applying a secondary current to the stator windings to selectively generate a secondary magnetic field by inducing eddy currents in at least one of the stator assembly and the rotor assembly to heat the plurality of ferrite permanent magnets, heating the plurality of ferrite permanent magnets by inducing eddy currents in a ring element positioned on or in the rotor assembly to heat up the ring element, or heating the plurality of ferrite permanent magnets by applying a magnetic field to a plurality of magnetocaloric elements positioned adjacent the plurality of ferrite permanent magnets, wherein the plurality of magnetocaloric elements heat up when subjected to the magnetic field.

According to yet another embodiment of the invention, in the ring element responsive to application of a pulsating current to the stator windings, so as to heat up the ring element, and a plurality of magnetocaloric an internal permanent magnet machine includes a stator assembly having a stator core including a plurality of stator teeth and stator windings wound about the plurality of stator teeth to generate a stator magnetic field when excited with alternating currents. The internal permanent magnet machine also includes a rotor assembly disposed within a cavity defined by the stator assembly and configured to be separated from the stator core by an air gap and rotate relative to the stator assembly, a plurality of ferrite permanent magnets positioned in the rotor assembly and configured to generate a magnetic field that interacts with the stator magnetic field to produce a torque, and a heating element configured to provide pre-heating to the plurality of ferrite permanent magnets. The heating element comprises one of a ring element formed of an electrically conductive material and positioned on or within the rotor assembly, wherein eddy currents are induced elements positioned adjacent the plurality of ferrite permanent magnets, the plurality of magnetocaloric elements configured to heat-up when subjected to a magnetic field.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A permanent magnet machine comprising:
    a stator assembly comprising:
        a stator core including a plurality of stator teeth arranged circumferentially so as to form a cavity at a center of the stator core; and
        at least one stator winding wound about the plurality of stator teeth;
    a rotor assembly disposed within the cavity configured to rotate relative to the stator assembly;
    a plurality of ferrite permanent magnets disposed within either the stator assembly or the rotor assembly;
    a temperature measuring mechanism configured to monitor the temperature of the plurality of ferrite permanent magnets; and
    a controller programmed to:
        cause a primary current to be applied to the stator winding to generate a stator magnetic field, so as to cause the rotor assembly to rotate relative to the stator assembly;
        receive feedback from the temperature measuring mechanism regarding the monitored temperature of the plurality of ferrite permanent magnets; and
        selectively cause a secondary current to be applied to the stator winding to generate a secondary magnetic field, so as to heat the plurality of ferrite permanent magnets if the monitored temperature of the plurality of ferrite permanent magnets falls below a threshold temperature.

2. The permanent magnet machine of claim 1 wherein the rotor assembly further comprises a ring element formed of an electrically conductive material, wherein eddy currents are induced in the ring element responsive to application of the secondary current to the stator winding.

3. The permanent magnet machine of claim 2 wherein the ring element is positioned on or within the rotor assembly, such that the ring element is positioned adjacent to the plurality of ferrite permanent magnets.

4. The permanent magnet machine of claim 2 wherein the ring element is connected to the stator assembly using a resistive element or inductive element.

5. The permanent magnet machine of claim 1 wherein the rotor assembly comprises a plurality of magnetocaloric elements positioned adjacent the plurality of ferrite permanent magnets, the magnetocaloric elements configured to produce heat when subjected to a magnetic field.

6. The permanent magnet machine of claim 1 wherein the secondary current has a frequency that is higher than a frequency of the primary current.

7. The permanent magnet machine of claim 1 wherein the secondary current is a pulsating current having a frequency greater than or equal to about 10 Hz.

8. The permanent magnet machine of claim 1 wherein the controller is programmed to cause the secondary current applied to the stator winding to be superimposed on the applied primary current.

9. The permanent magnet machine of claim 1 wherein the controller is programmed to cause the secondary current to be applied to the stator winding absent the primary current being applied.

10. A method for heating a ferrite permanent magnet electrical machine, the method comprising:
   providing a stator assembly comprising:
      a stator core including a plurality of stator teeth arranged circumferentially so as to form a cavity at a center of the stator core; and
      at least one stator winding wound about the plurality of stator teeth;
   providing a rotor assembly disposed within the cavity configured to rotate relative to the stator assembly;
   providing a plurality of ferrite permanent magnets positioned on either the stator assembly or the rotor assembly; and
   selectively heating the plurality of ferrite permanent magnets if a temperature of the plurality of ferrite magnets falls below a threshold temperature, wherein selectively heating the plurality of ferrite permanent magnets comprises one or more of:
      applying a current to the stator winding to selectively generate a magnetic field;
      inducing eddy currents in a ring element positioned on or in the rotor assembly; or
      applying a magnetic field to a plurality of magnetocaloric elements positioned adjacent to the plurality of ferrite permanent magnets, wherein the plurality of magnetocaloric elements heat up when subjected to the magnetic field.

11. The method of claim 10 wherein inducing eddy currents in the ring element comprises applying the current to the stator winding.

12. The method of claim 10 wherein the current applied to the stator winding has a frequency greater than or equal to 10 Hz.

13. The method of claim 10 wherein the current applied to the stator windings comprises applying a pulsating current.

14. An internal permanent magnet machine comprising:
   a stator assembly comprising:
      a stator core including a plurality of stator teeth; and
      at least one stator winding wound about the plurality of stator teeth;
   a rotor assembly disposed within a cavity defined by the stator assembly and configured to rotate relative to the stator assembly;
   a plurality of ferrite permanent magnets positioned in the rotor assembly;
   a temperature measuring mechanism configured to monitor the temperature of the plurality of ferrite permanent magnets; and
   a heating element configured to heat the plurality of ferrite permanent magnets when the monitored temperature of the plurality of ferrite permanent magnets falls below a threshold temperature, the heating element comprising either:
      a ring element formed of an electrically conductive material and positioned on or within the rotor assembly, the ring element configured to heat up when a current is applied to the stator winding; or
      a plurality of magnetocaloric elements positioned adjacent the plurality of ferrite permanent magnets, the plurality of magnetocaloric elements configured to heat up when subjected to a magnetic field.

15. The internal permanent magnet machine of claim 14 further comprising a controller programmed to:
   cause a primary current to be applied to the stator winding to generate a stator magnetic field, so as to cause the rotor assembly to rotate relative to the stator assembly; and
   selectively cause a secondary current to be applied to the stator winding to generate a secondary magnetic field, so as to heat the plurality of ferrite permanent magnets if the temperature of the plurality of ferrite permanent magnets falls below a threshold temperature.

16. The internal permanent magnet machine of claim 14 wherein the secondary current is an alternating current having a frequency greater than or equal to about 10 Hz.

17. The internal permanent magnet machine of claim 14 wherein the heat generated in either the ring element or the magnetocaloric elements is transferred to the plurality of ferrite permanent magnets to provide heating thereto.

* * * * *

UNITED STATES PATENT AND TRADEMARK OFFICE
CERTIFICATE OF CORRECTION

| | | |
|---|---|---|
| PATENT NO. | : 9,698,660 B2 | Page 1 of 1 |
| APPLICATION NO. | : 14/063547 | |
| DATED | : July 4, 2017 | |
| INVENTOR(S) | : Patel Bhageerath Reddy et al. | |

It is certified that error appears in the above-identified patent and that said Letters Patent is hereby corrected as shown below:

In the Claims

In Column 11, Line 32, add before the word 'and':
--providing a temperature measuring mechanism configured to monitor the temperature of the plurality of ferrit permanent magnets;--

In Column 11, Line 34, delete:
"a"
And insert:
--the monitored--

In Column 12, Line 42, add before the word 'temperature':
--monitored--

In Column 12, Line 43, delete:
"a"
And insert:
--the--

Signed and Sealed this
Third Day of October, 2017

Joseph Matal
*Performing the Functions and Duties of the
Under Secretary of Commerce for Intellectual Property and
Director of the United States Patent and Trademark Office*